H. TUNSTALL.
COMBING MACHINE.
APPLICATION FILED OCT. 7, 1918.
1,351,076.
Patented Aug. 31, 1920.
12 SHEETS—SHEET 9.
Fig-8.
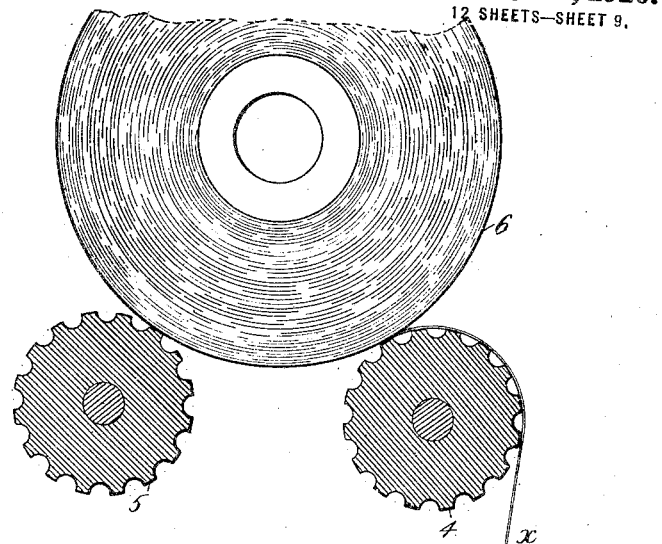
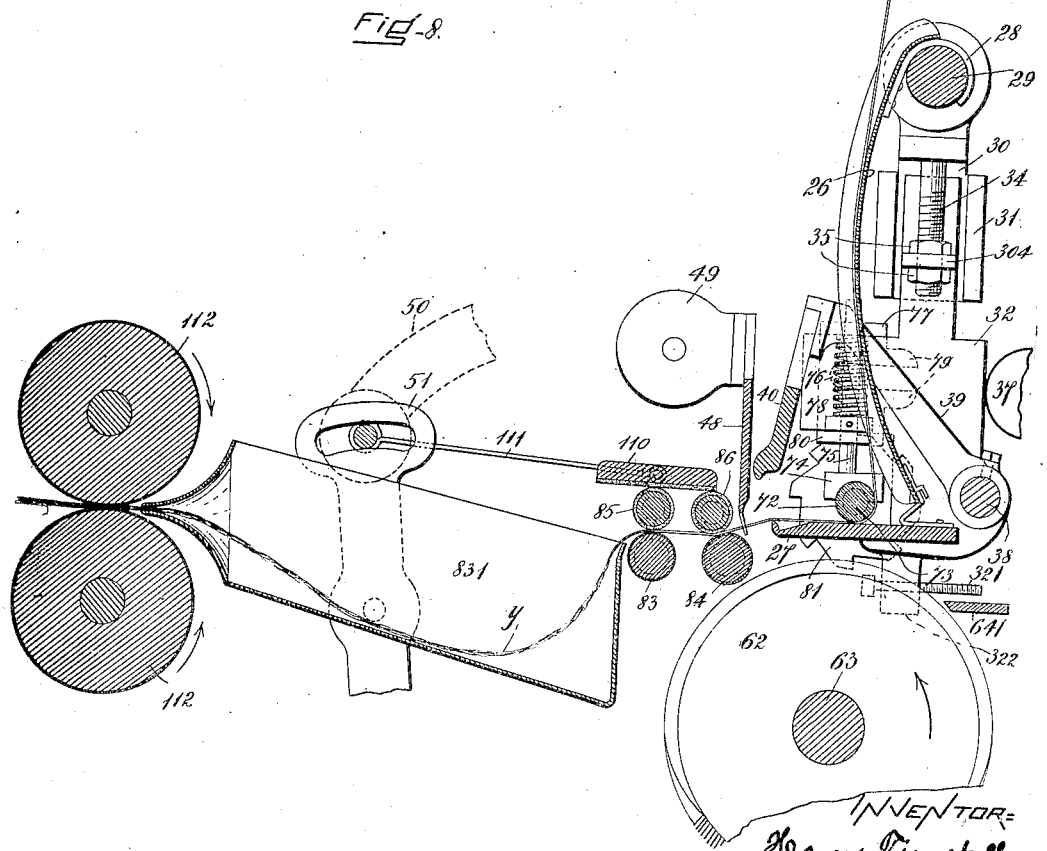
INVENTOR:
Harry Tunstall
By Coxe & Hayes
HIS ATTORNEYS.

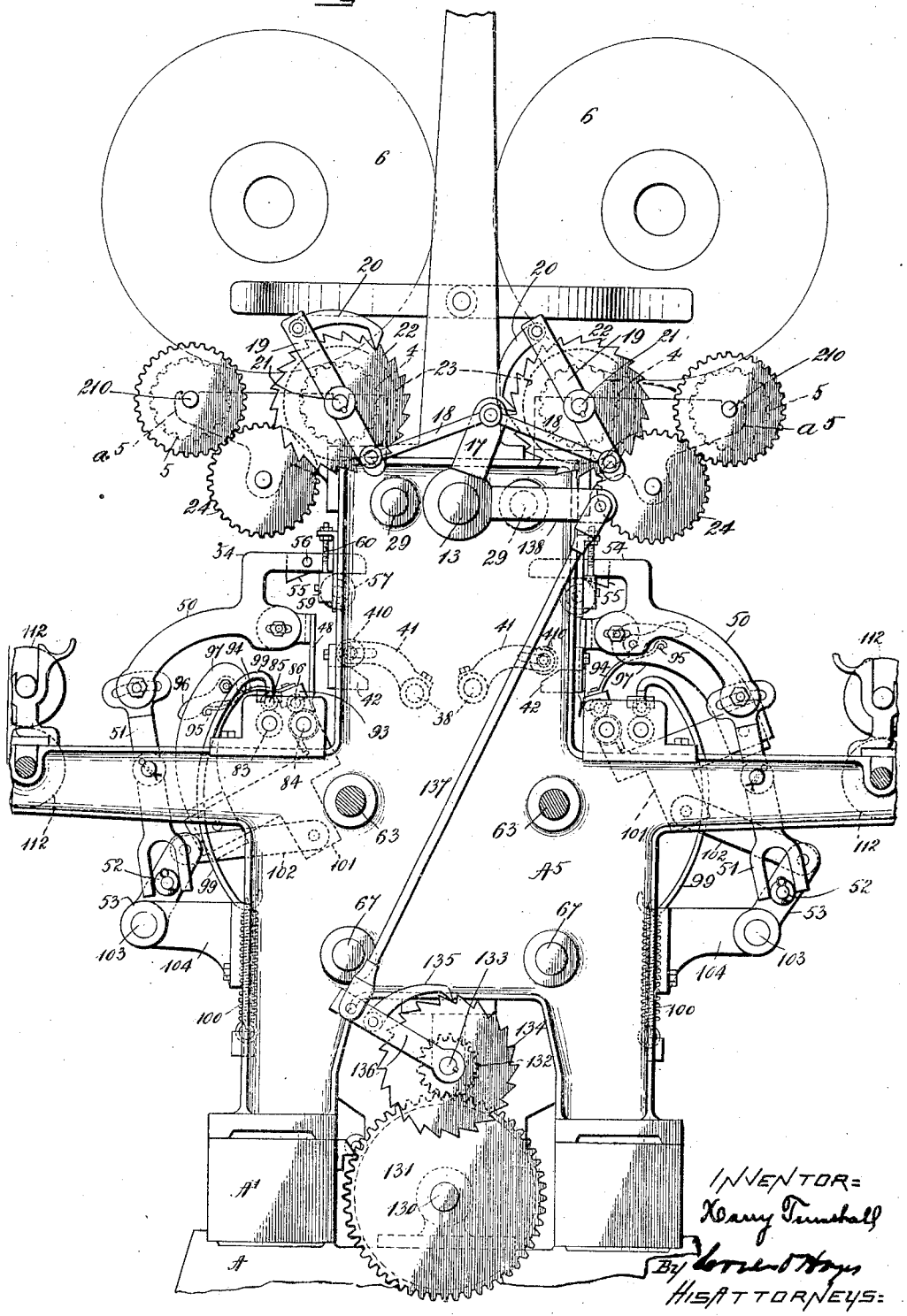

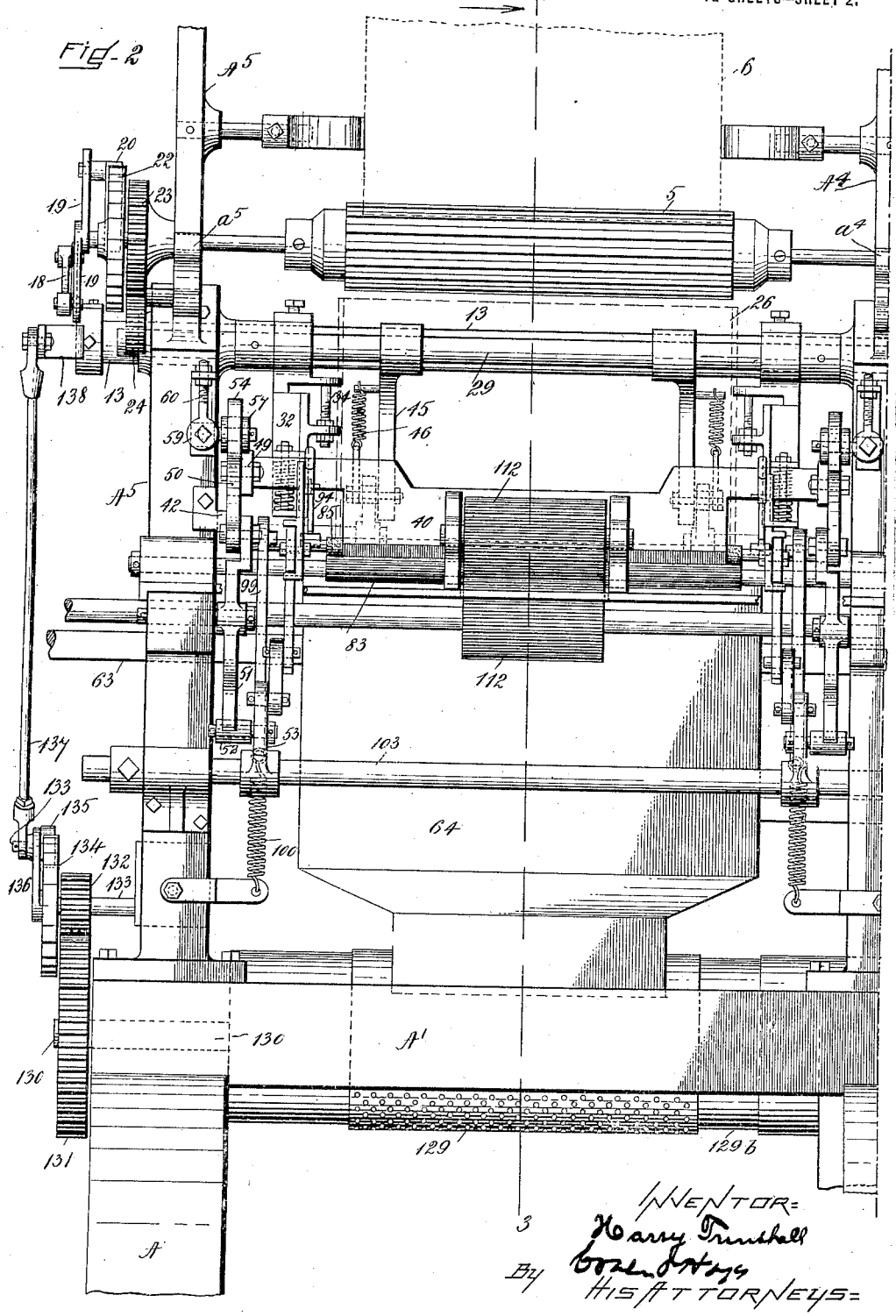

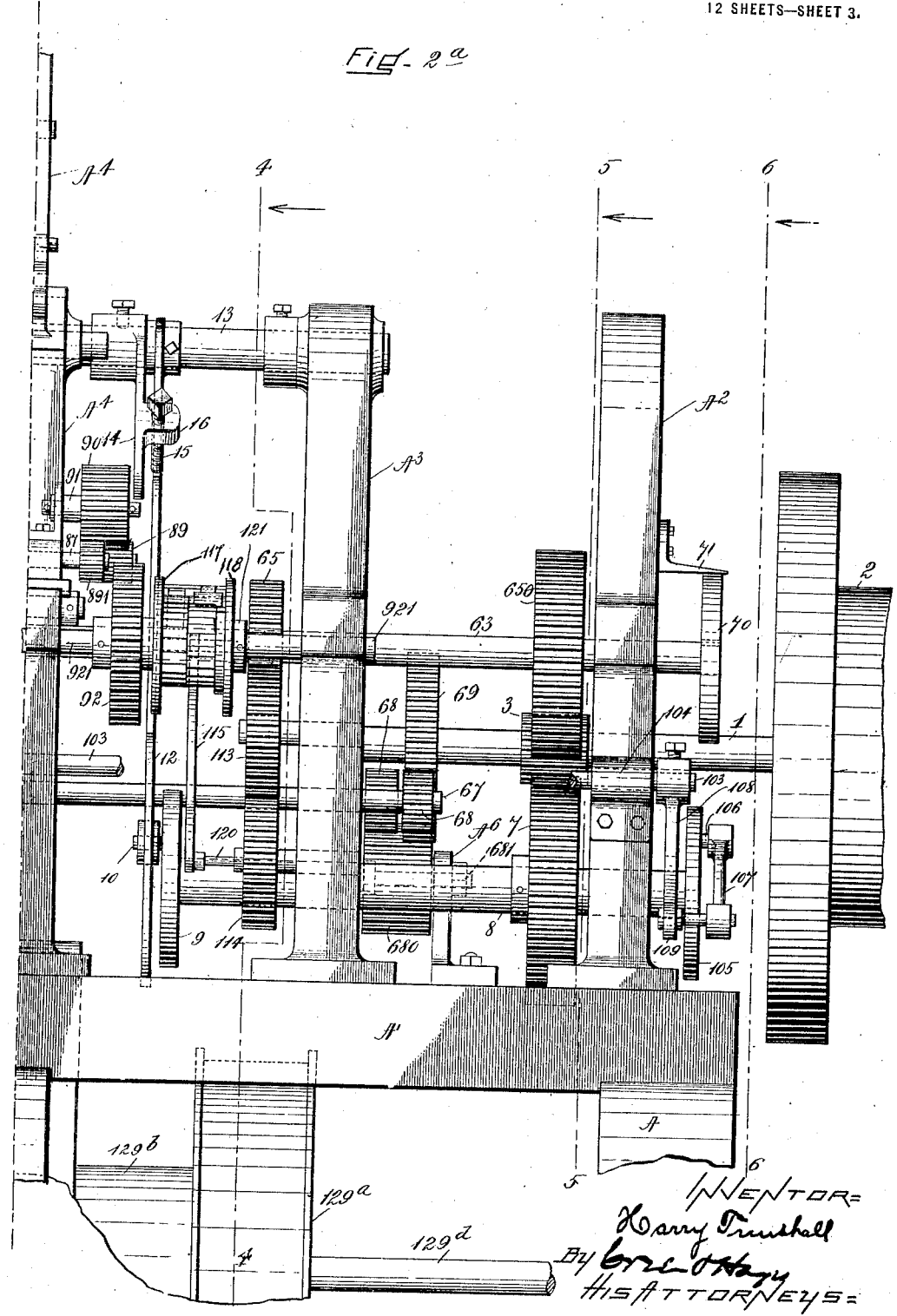

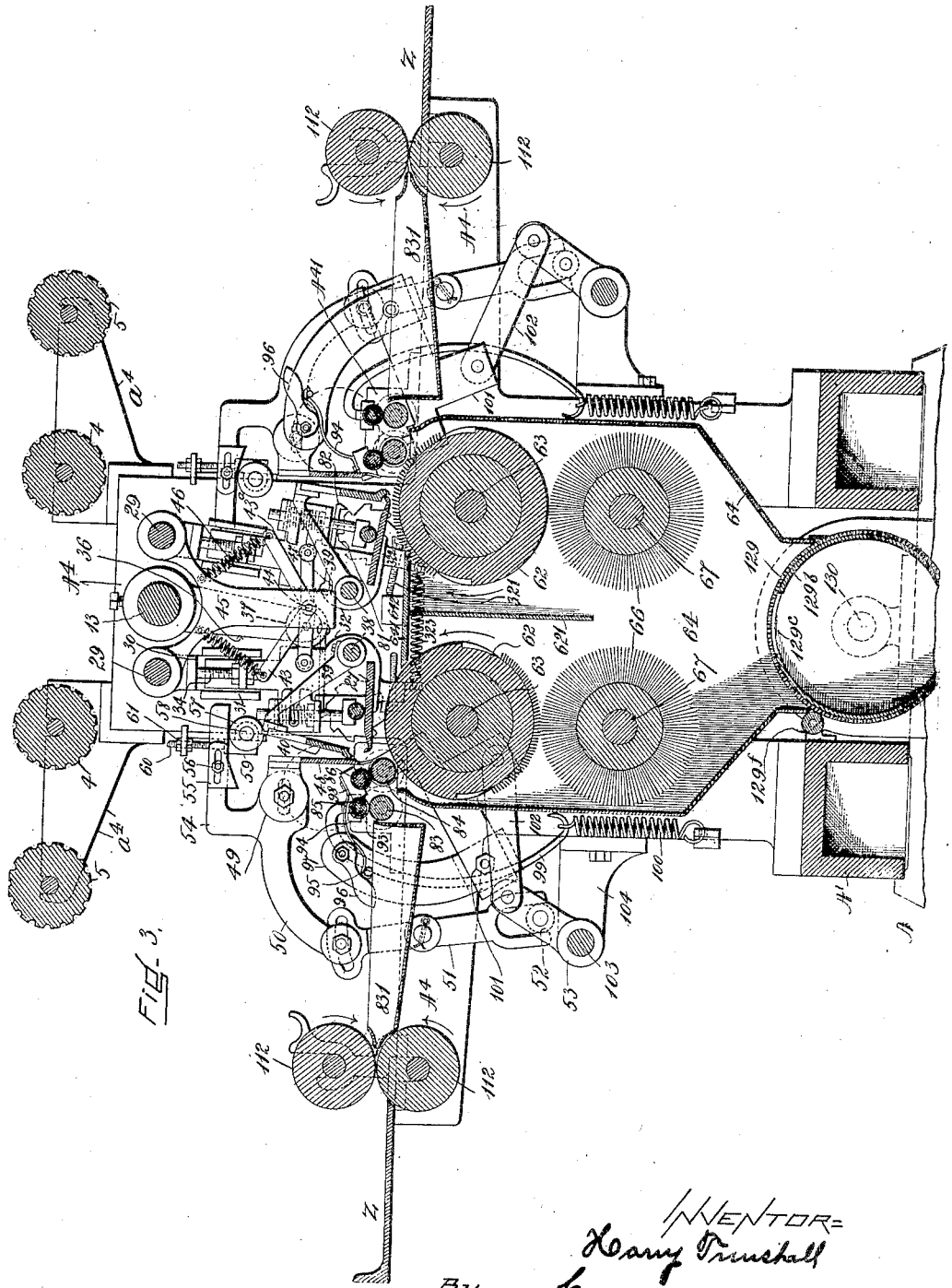

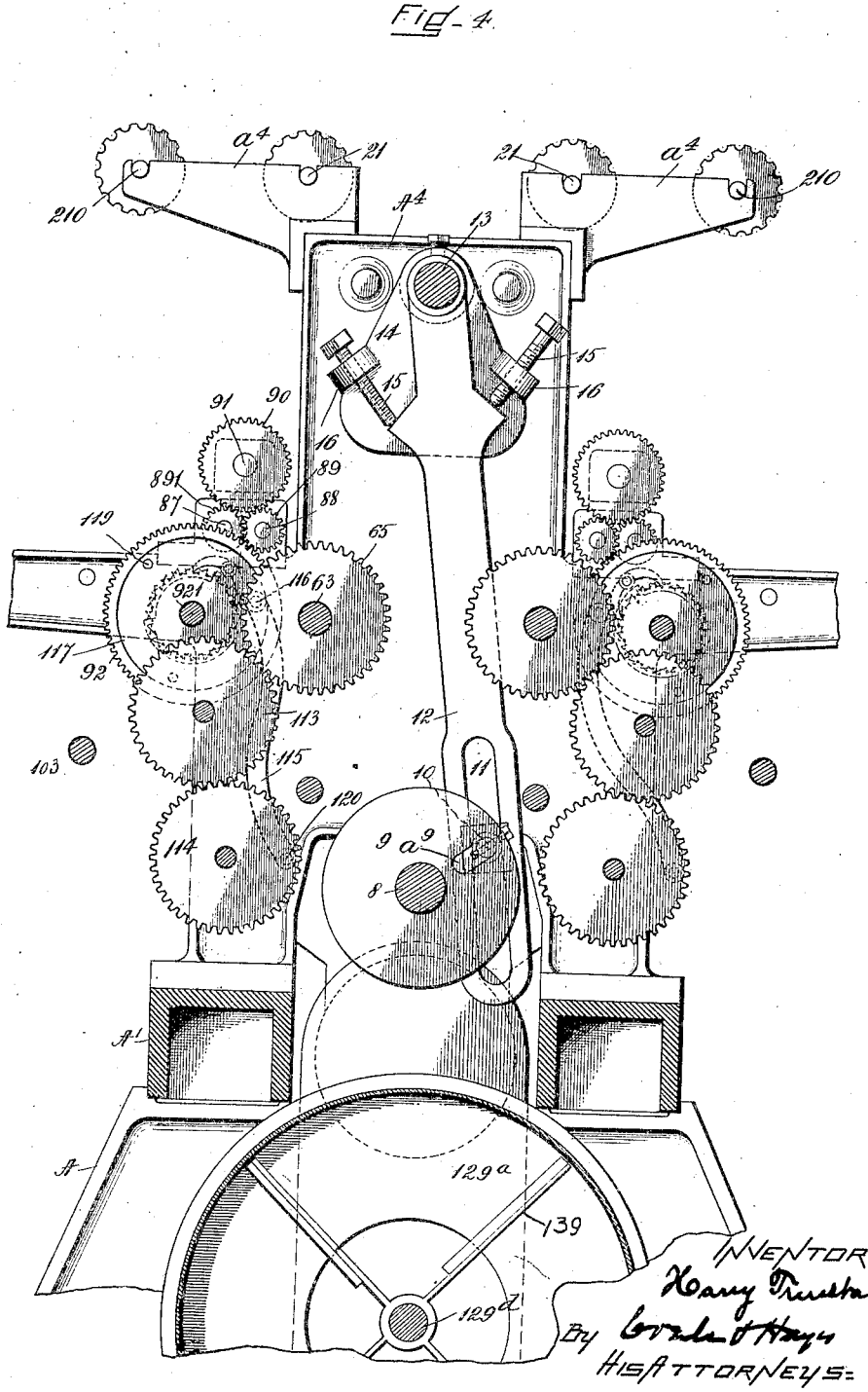

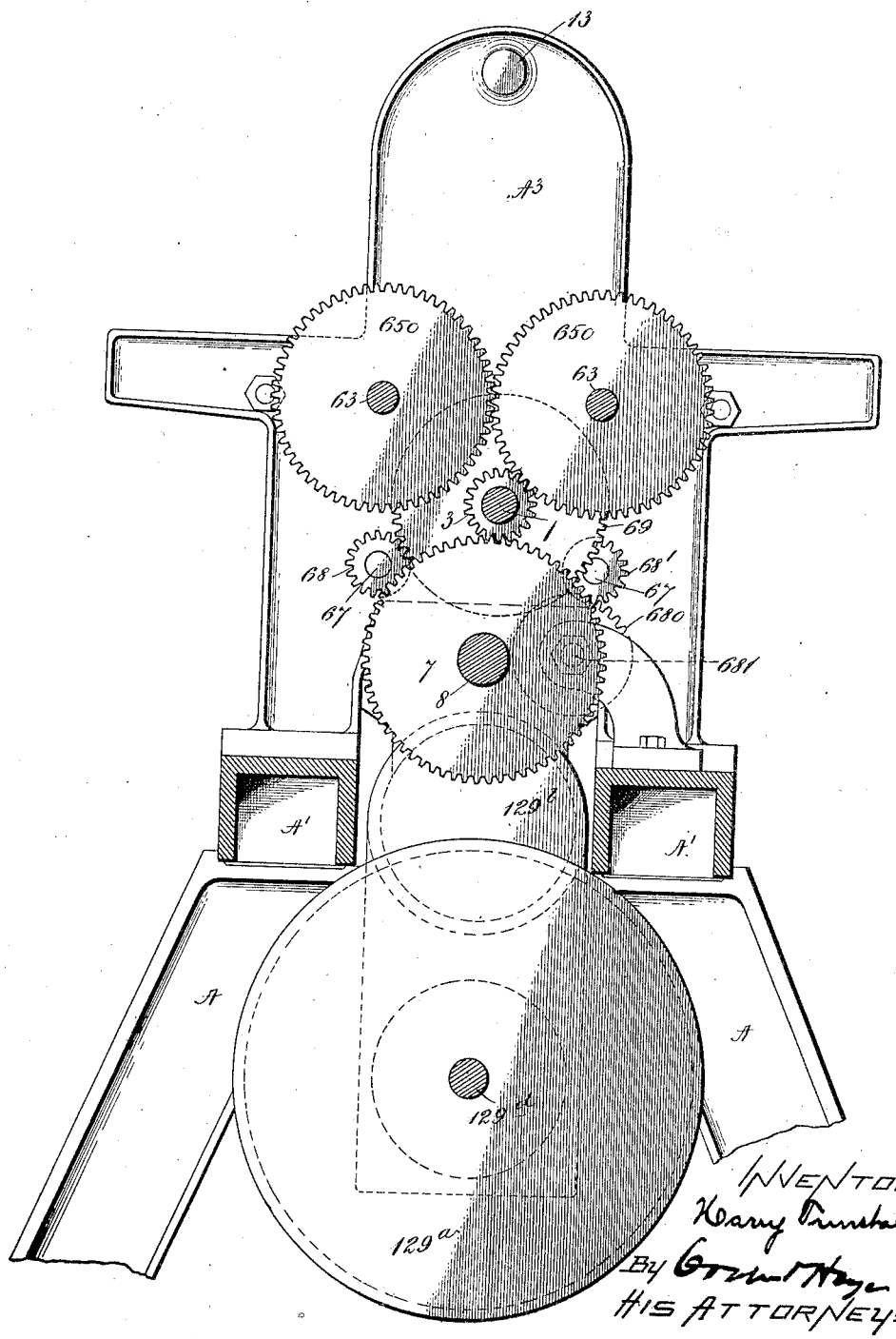

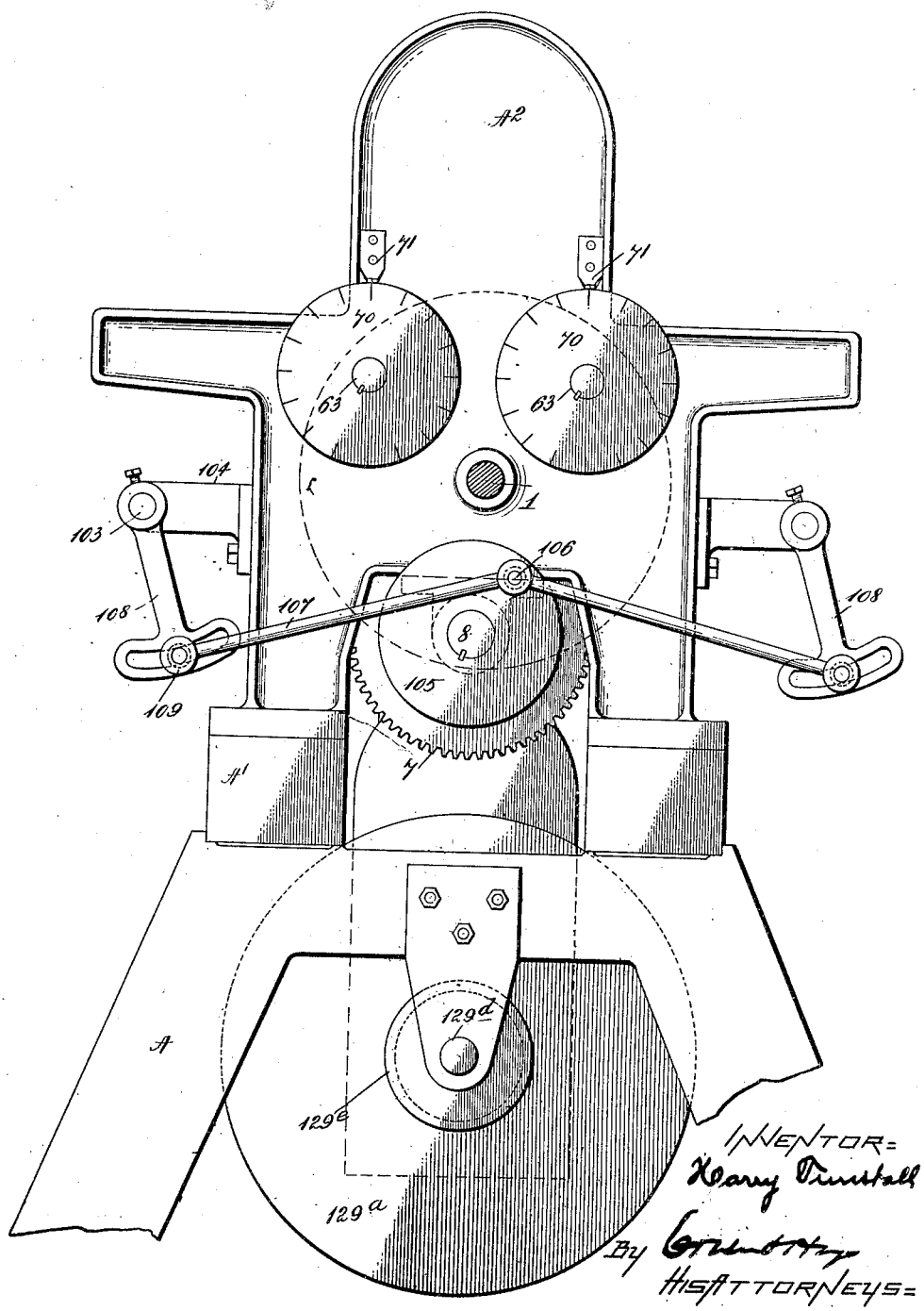

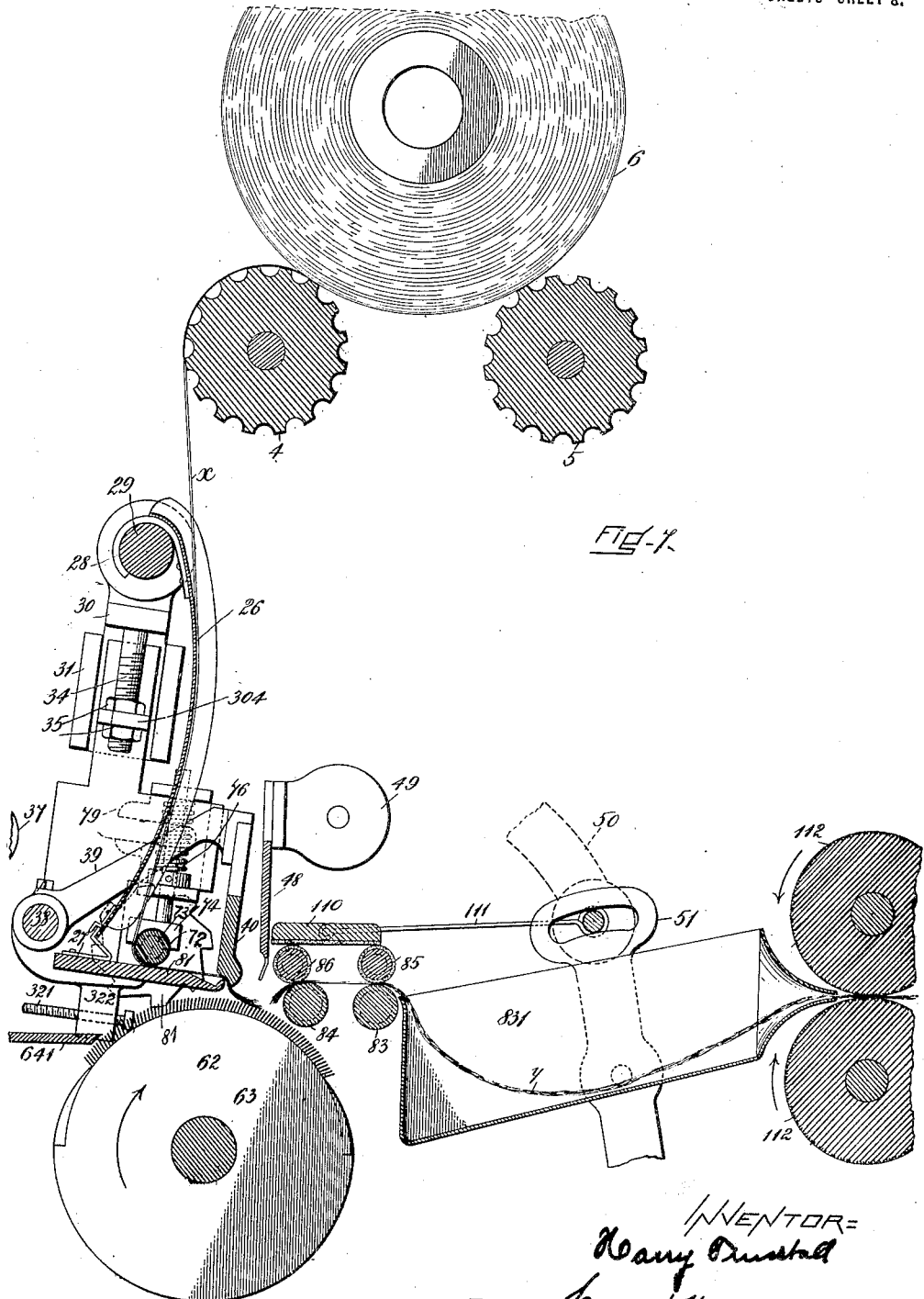

H. TUNSTALL.
COMBING MACHINE.
APPLICATION FILED OCT. 7, 1918.
1,351,076.
Patented Aug. 31, 1920.
12 SHEETS—SHEET 10.
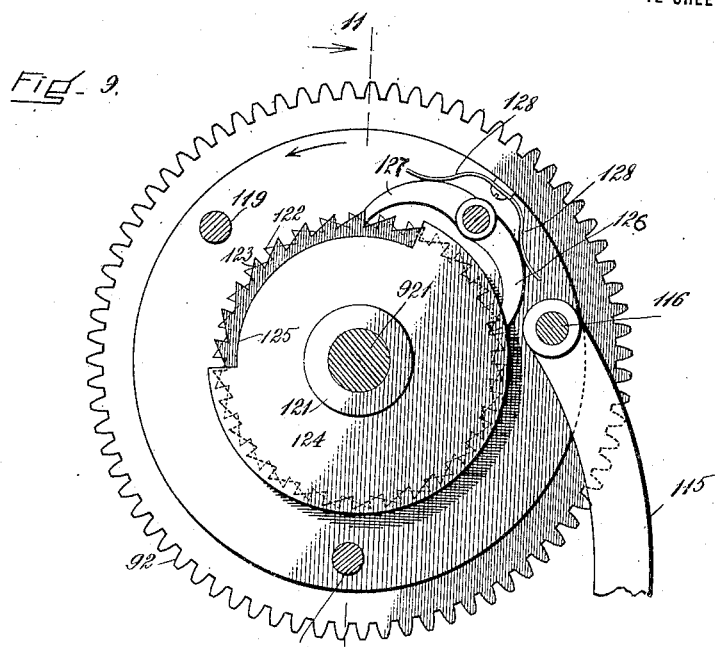
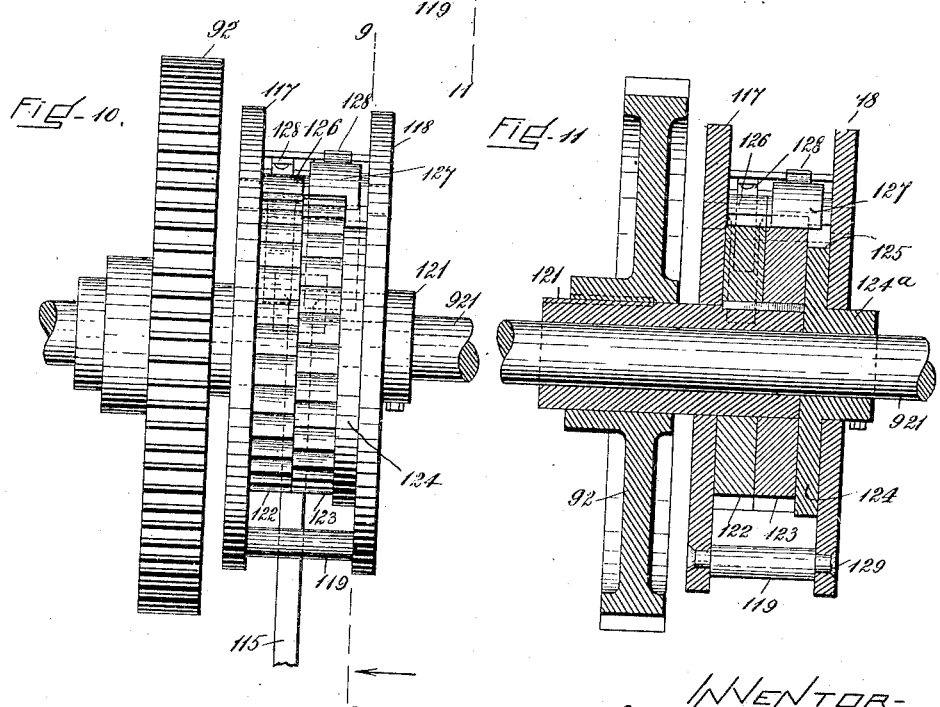
INVENTOR:
Harry Tunstall
BY
HIS ATTORNEYS

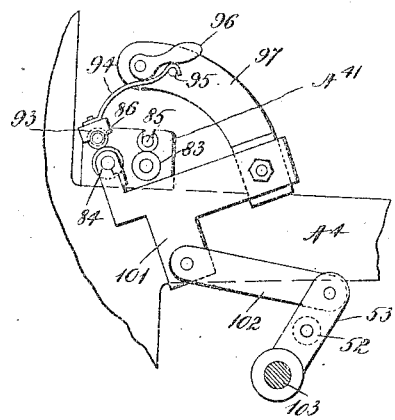
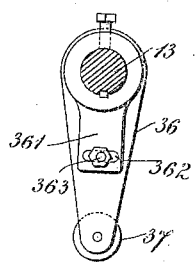
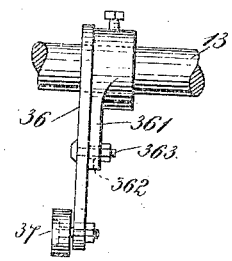

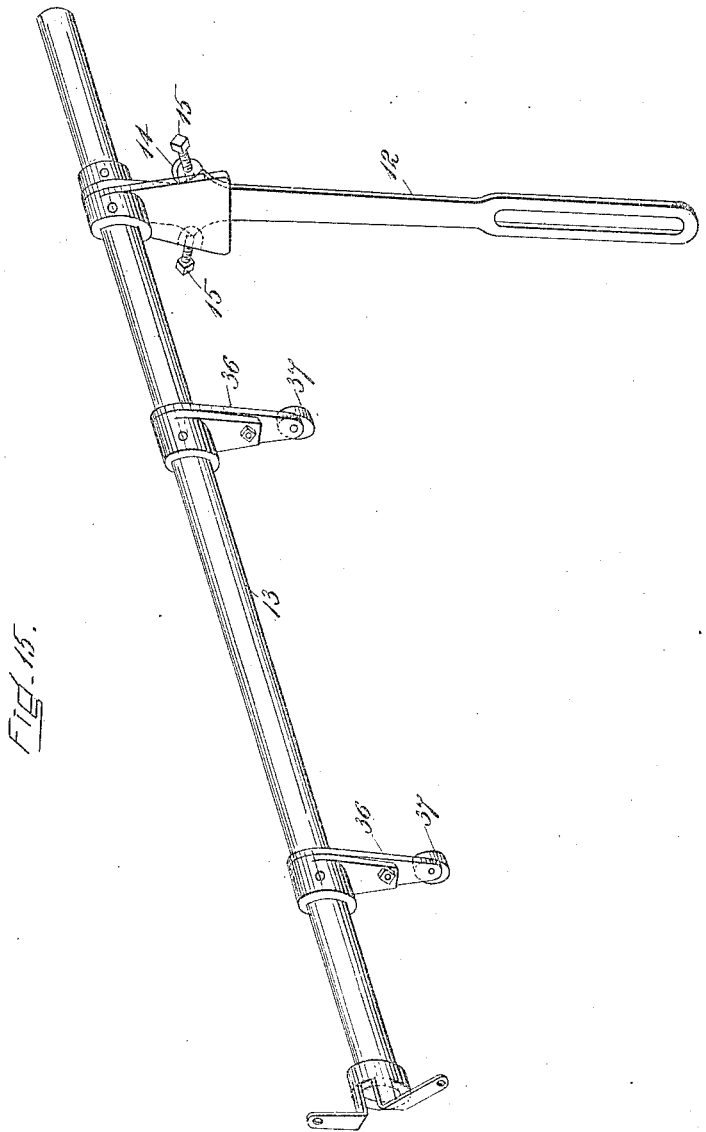

UNITED STATES PATENT OFFICE.

HARRY TUNSTALL, OF FAIRHAVEN, MASSACHUSETTS, ASSIGNOR TO ALSATIAN MACHINE COMPANY, OF BOSTON, MASSACHUSETTS, A CORPORATION OF MASSACHUSETTS.

COMBING-MACHINE.

1,351,076.  Specification of Letters Patent.  Patented Aug. 31, 1920.

Application filed October 7, 1918. Serial No. 257,089.

*To all whom it may concern:*

Be it known that I, HARRY TUNSTALL, of Fairhaven, in the county of Bristol and State of Massachusetts, a subject of George V, King of Great Britain and Ireland, have invented a new and useful Improvement in Combing-Machines, of which the following is a specification.

My invention relates to the well known Heilman comber, so called, and consists in various improvements which make possible the driving from the same shaft of two independent sets of combers which may be adjusted independently so that the two parts of the same machine may deliver combed slivers differing in the lengths of the fibers of which they are composed. My improved machine as shown is constructed to feed positively and accurately, as by a pawl and ratchet feed, only a given length of lap at a time, the operation being caused without the use of cams or other parts which are subject to wear. My machine is also provided with means whereby the two parts of the nipper may be adjusted to accommodate different lengths of staple, so that different lengths of staple can be run on the two sides of the machine, say 1⅜ inch staple on one side and 1¼ inch staple on the other side. Moreover the adjustment of the nippers is made without interfering with any other motion in the machine.

Other improvements will be understood from the description which follows of a machine which embodies my invention in the best form now known to me.

In its construction I have been enabled to dispense with all weights and the cams which are a constant source of trouble in a combing machine because they are constantly wearing and so changing the movements of various parts and rendering the machine difficult of adjustment and inaccurate.

In the drawings:—

Figure 1 is an elevation taken at the end of the machine opposite to that at which power is applied.

Fig. 2 is a side elevation of that end of the machine which is shown in Fig. 1, Fig. 2ª being a side elevation of the other end of the machine, these two views giving together a complete side elevation, the combing mechanism shown in Fig. 2 being capable of duplication.

Fig. 3 is a section on line 3—3 of Fig. 2, and

Figs. 4, 5 and 6 are sections on lines 4—4, 5—5 and 6—6 of Fig. 2ª.

Figs. 7 and 8 are sectional details showing the combing mechanism on the two sides of the machine and in different positions.

Fig. 9 is a section on line 9—9 of Fig. 10.

Fig. 10 is a side elevation, and

Fig. 11 is a section on line 11—11 of Fig. 9, all showing the clutch mechanism described below.

Figs. 12, 13 and 14 are details described below.

Fig. 15 is a perspective view showing the shaft for operating the nipper mechanism.

The various parts of the frame include the supporting legs $A$, the table $A^1$ and the uprights $A^2$, $A^3$, $A^4$, $A^5$ and $A^6$ on the table, which serve as bearings for the shafts, etc.

1 is the power shaft mounted in the uprights $A^2$, $A^3$ and carrying the pulley 2 at its outer end and a pinion 3 by which power is applied to the two sides of the machine. As the two sides of the machine are identical in construction, the description and reference characters will apply equally well to both sides so far as they are shown.

The lap feed will first be described. The lap rolls are shown at 4 and 5, the roll 4 being the roll to which power is directly applied and being mounted on shaft 21, the roll 5 being on shaft 210 and operated therefrom. On these rolls rest the lap 6. The shafts 21, 210 of these rolls run in bearings in the arms $a^4$, $a^5$ projecting from the uprights $A^4$, $A^5$. The pinion 3 on shaft 1 meshes with the gear 7 on shaft 8 mounted in the uprights $A^2$, $A^3$. The shaft 8 carries at one end a crank disk 9 carrying a crank pin 10 on its farther side.

This pin runs in a slot 11 in the rocker arm 12 hanging from the rock shaft 13, supported in the uprights $A^4$ and $A^5$. A plate 14 is suspended from the rock shaft 13 and is fast on the shaft 13, and the arm 12 is fixedly but adjustably held in place by screws 15 which pass through lugs 16 on the plate 14 and engage the edges of the arm 12 preferably shaped for the purpose.

The farther end of the shaft 13 carries an arm 17 (see Fig. 1) which is connected by two links 18 with pawl levers 19, one on each shaft 21, each lever carrying a pawl 20 whereby the power-operated lap rolls 4 are intermittently rotated. Each power-operated lap roll 4 is mounted on a shaft 21 which carries a ratchet 22 and also a gear 23 in mesh with an idler 24, which meshes with a gear 25 on the shaft 210 carrying the lap roll 5. Thus the rotation of the roll 4 will cause the rotation of the roll 5 in the same direction. As is usual, the lap rolls 4 and 5 are fluted rolls and the ratchets and pawls are so constructed and moved as to cause them to unwind the lap by engagement therewith so that it will be fed over the usual apron 26.

The nipper mechanism comprises the usual parts, but they are operated in a way new with me. Each lower nipper blade 27 is attached to the nipper frame 32 and has a swinging movement. It has slidably connected to it the lower end of the apron 26, the upper end of which hangs by hooks 28 over the stationary shaft 29 so that it may swing thereon. From this same shaft 29 are hung two guide frames 30, one at each end thereof, having guide flanges 31 between which is carried the nipper frame 32. This frame 32 has a forwardly-projecting plate 304 having an opening through which runs a downwardly projecting screw 34 carrying nuts 35, which adjust the vertical position of the frame 32 and lower nipper, one nut being located on each side of the plate 304.

The guide frames 30 and the nipper frames 32 supported by them are free to swing on shaft 29 and are oscillated by means of two arms 36 which are fast on the rock shaft 13. For this purpose the shaft 13 carries two arms 36, one near the frame $A^4$ and the other near the frame $A^5$, one of which only is shown (see Fig. 3). They are located in Fig. 2 behind the aprons or lap plates 26. Each arm carries a roll 37 which engages with the nipper frames 32 as the arm swings, so that each oscillation of the shaft 13 pushes the frame 32 out of its normal position which is shown in Fig. 7, into the position shown in Fig. 8 (see also Fig. 3), against the force of the spring 323 which connects the frames 32 as described below.

The frames 32 holding the lower nipper 27 at each end also carry a shaft 38, to each end of which is attached an arm 39, these arms supporting the upper nipper 40 between them. These arms and the lower nippers have a horizontal reciprocating movement due to the swinging of the frame 32 and an independent vertical rocking movement is given them. It will be noted that the movements of the lower nippers and frames are reversed, the frame on the right hand of the machine in Fig. 3 moving inward, while the frame on the other side of the machine moves outward, and one upper nipper being up while the other is down (see Figs. 3, 7 and 8).

The rocking of the arms 39 and the consequent vertical movement of the upper nipper 40 is caused by the arms 41 carrying a roll 410. One of these arms is located at the rear end of each shaft 38 and as the frame 32 oscillates each roll 410 in turn strikes an inclined surface on a lug 42 on the frame $A^5$ and causes the free end of the arm 41 to ride up the incline and turn the shaft 38 which lifts the upper nipper. To lower the upper nipper I have provided levers 43, $43^a$ which are pivoted at 44 to the plate 45 which hangs from the shafts 29. A spring 46 is attached to the upper end 43 of each lever, the other end of these springs being attached to the plate 45. The arms of these levers 43, $43^a$ are at an obtuse angle to each other and the end of the lower or horizontal arm of each lever carries a friction roll 47 in position to strike the opposing arm 39 and hold it against the force of the spring 46. Thus an upper nipper is lifted by the inclined surface on a lug 42 and depressed by engagement with the lever arm 43, the springs 46 allowing the upper nipper to adjust itself to the position of the lower nipper and yet hold the fiber firmly.

The top comb 48 is mounted at each end on a plate 49 at right angles to it. Each plate is mounted on an arm 50, which is slotted for purposes of adjustment. Each arm 50 is moved in and out horizontally, being adjustably attached to one end of a lever 51 pivoted to a portion of the frame $A^4$, $A^5$. The lower end of the lever 51 is forked to straddle a roll 52 running on a stud projecting from the rocker arm 53 on shaft 103.

Each arm 50 carries an angular arm 54 extending upwardly and inwardly therefrom and carrying adjustable thereon a plate 55, the lower edge of which is inclined, and which is attached thereto by the bolt 56 so as to adjust, if necessary, the direction of movement of the comb 48 and raise the top comb 48 so as not to impede the retraction of the fibers. The under surface of each arm 50 or its plate 55 rides on roll 57. The bearings 58 for this roll are mounted in a plate 59 which is adjusted vertically by a screw 60 in a usual manner, and is locked after adjustment by nuts 61.

The comb cylinder 62 is of ordinary construction and operation. Each cylinder is mounted on a shaft 63 carried in the frames $A^3$, $A^4$ and $A^5$ and the cylinders themselves are inclosed in a box 64. Each shaft 63 carries a gear 65 and also a gear 650, the gears 650 being in mesh with each other and one of them being in mesh with the pinion 3 on the power shaft 1. Each shaft 63 also carries the usual timing disks 70, 70, 71 being pointers attached to the frame A². The usual brushes 66 are also provided in the box 64. Each is mounted on a shaft 67 in the frames A³, A⁴, A⁵. One of these shafts carries a pinion 68 in mesh with the gear 69 on the power shaft 1. The pinion 68' on the other shaft meshes with the idler 680 on a stud carried by the upright A⁶, the idler being in mesh with the gear 69.

Each frame 32 also carries a roll 72 between which and the lower nipper 27 the lap $x$ passes. This roll has a neck 73 at each end on which rests a shoe 74 on the lower end of a spring-controlled rod 75, the spring 76 of which holds the roll 72 on the lower nipper 27, being confined between the projections 77, 80, on a plate 78, which is bolted to the frame 32. The plate 78 is slotted as at 79 so that the roll-supporting mechanism may be adjusted in or out (see Figs. 7 and 8 where the slot 79 is shown in dotted lines).

The roll 73 is rotated step by step by the ratchet 81 mounted thereon and the pawl 82 attached to the upright A⁴ (see Fig. 3).

The piecing-up rolls are four in number, 83, 84 being the driven rolls and 85 and 86 the leather covered rolls, which rest on the sliver $y$. One end of each driven roll shaft 87, 88, has a pinion 89, 891. Each of these pinions 89, 891, mesh with the idler gear 90 on a stud 91 supported on frame A⁴, A⁵ and the pinion 89 engages a gear 92 carried by the shaft 921 and forming part of a clutch mechanism which is also carried on the shaft 921 and is to be described below. The driven roll 85 is mounted in bearings in plate A⁴¹.

The rolls 85 and 86 rest on the sliver $y$ passing over and fed by the rolls 83 and 84. The bearing 93 for the shaft of roll 86 is mounted on the end of a spring 94, the rear end of which engages the pin 95 attached to the arm 97. A lever 96 also mounted on an arm 97 may be used to give tension to this spring. The bearings 98 for the roll 85 are mounted on the upper end of a hook arm 99, the lower end of which is connected to the spiral spring 100, the other end of which is attached to one of the uprights A⁴, A⁵, so that the roll 85 will be held under tension against the sliver.

The arm 97 is mounted on a rocking frame 101 which is hung on the shaft of roll 84 so that it may be oscillated around it, and it is connected by the link 102 with the rocker arm 53 on shaft 103. Each shaft 103 is mounted in brackets 104 on the uprights A⁴, A⁵ and is oscillated by the disk 105 on the shaft 8 which carries a crank pin 106 connected by a link 107 to a rocker arm 108 by a slotted adjustable connection 109, the rocker arm 108 being attached to the shaft 103. Thus the rolls 86 will be given a movement around the axis of the rolls 84 (see Figs. 6, 7 and 8). Uniform pressure is thus always given to the roll 86 to press the fleece or lap against the steel roll 84, which has not heretofore been the case.

A cleaner 110 rests on the top rolls 85 and 86. It is attached to rods 111 which are connected to the pins which connect the lever 51 with the arm 50.

The clutch above referred to is for the purpose of giving the rolls 84 and 85 a rocking movement, to feed the sliver rearward to receive the new fibers and forward to the delivery rolls 112. These sliver feed rolls 112 are moved in the usual way.

As stated above, each pinion 89 engages the gear 92 of the clutch mechanism to be moved thereby. Each clutch by which a gear 92 is operated is oscillated in the following manner (see Figs. 4, 9, 10 and 11):—

The gear 65 on shaft 63 meshes with an idler 113 in mesh with a gear 114 which is connected by a link 115 to a pin 116, which connects together disks 117 and 118 forming parts of the clutch. Other pins 119 connect these disks together. This train of gears is thus rotated by shaft 63. The location of pin 116 is such that the radius of its movement is greater than the radius of movement of the pin 120 which connects the other end of the link 115 with its gear 114. Thus the rotation of the gear 114 will oscillate the disks and the parts fixedly connected therewith.

Free on the shaft 921 is a sleeve 121 and to this sleeve the gear 92 and ratchets 122 and 123 are keyed. This sleeve also carries the disk 117 free to turn thereon. A disk 124 which is of smaller diameter than the disk 117 and is cut away as at 125 to expose for a portion of its periphery the teeth on the ratchet 123, has a hub 124ª which is adjustably fixed on the shaft 921 and on this hub 124ª is mounted free thereon the disk 118, which is attached to the disk 117 by the pins. It will be seen that the cut-away portion 125 of the disk 124 exposes a portion of the teeth of ratchet 123, and the periphery of the surface of greatest diameter of the disk 124 extends slightly beyond the radius of the ratchet teeth. The teeth of the ratchets 122 and 123 point in opposite directions, and pawls 126 and 127 are provided one of which engages the ratchet 122 and the other the ratchet 123. The pawl 127 is wider than the pawl 126 so as to overlap the disk 124. These pawls are held to their work by the springs 128 attached to a rod connecting the disks 117 and 118.

It will be seen therefore that when the link 115 lifts, it moves the pawls and the pawl 126 engages the ratchet 123 and pushes it in the direction of the arrow, the ratchet carrying with it the sleeve 121, the ratchet 122 and the gear 92.

When the link 115 is pulled downward it reverses the movement of the pawls and consequently the pawl 126 engages and moves the ratchet 122 and carrying with it the sleeve 121 and gear 92 and also the pawl 127, which drags over the teeth of ratchet 123. But when the pawl 127 reaches the part of the disk 124 having the greater diameter it rides up onto it, so that when the link rises again and the movement of the pin 115 is reversed the pawl 127 moves first along the smooth surface of the disk 124 until it drops into the teeth and gives motion to the ratchet, sleeve and gear. This disk 124 is adjustable on shaft 921 so that it will engage at any desired time in its path of operation the pawl 127.

The result of this construction and operation is to give to the detaching rolls by means of the gear 92 an intermittent oscillating movement, which is, however, progressive in that its movement in one direction is longer than its movement in the other so that the fibers being properly retracted will also be properly fed progressively forward and the amount of retraction may be adjusted according to the length of the fiber by adjusting the position of the disk 124 and consequently the time of engagement of the pawl 127 with the ratchet 123.

So far as I know, while machines heretofore have given to the detaching rolls the movement similar to the above, no machine has provided simple means for adjusting the retraction of the sliver.

In the lower part of the box 64 is located a rotary perforated cylinder 129. A shaft 130 mounted in bearings below the frames A⁴, A⁵ and A⁶ is connected to the cylinder 129. The shaft 130 carries a gear 131 at its rear end meshing with a pinion 132 on a stud 133 on frame A⁵, and is rotated intermittently by a ratchet 134 and its pawl 135 mounted on the stud 133, the part 135 being mounted on an arm 136 which is connected by a link 137 with the rocker arm 138 on the shaft 13.

Within the perforated cylinder 129 is a stationary cylinder 129ᵇ forming a chamber having an opening 129ᶜ which allows the dust from the box 64 to fall into the chamber, the stationary cylinder also forming a bearing for the rotary perforated cylinder 129. 129ᶠ is a friction roll to steady the cylinder 129.

The cylinder 129ᵇ leads into a box 129ᵃ which incloses a fan 139 mounted on a shaft 129ᵈ. This fan is of any suitable construction and is used to withdraw the dust, etc., which may collect in the interior of the stationary cylinder 129ᵇ. The fan 139 is mounted on a shaft 129ᵈ which has a pulley 129ᵉ by which it may be connected to a source of power. The side walls of the box 64 are preferably bent in toward the comb cylinders 62 and between the comb cylinders 62 is a partition 621 to prevent the waste being thrown from one combing cylinder to the other. This partition 621 is surmounted by a plate 641. Stops 642 are mounted on frames A⁴ and A⁵ to be engaged alternately by screws 321 which pass through projections 322 from the plate 32. A spring 323 connecting the projections 322 serves to draw the plates 32 toward each other, and the screws 321 serve with the stop 642 to limit the rearward movement of the frames 32 and of the nippers mounted on them. By turning either or both the screws in either direction the movements of the frames may be adjusted independently.

As described above, the arms 36 which swing the nipper frames 32 are made adjustable on the shaft 13, as shown in Figs. 13 and 14. In this case the shaft 13 carries shorter arms 361 adjustable on it and slotted as at 362, a bolt 363 passing through the slot and into the arm 36. The arms 36 and 361 being adjusted at a proper angle to each other, the nut on the bolt 363 is tightened. In this case it will be seen that a considerably greater throw may be given to one of the nipper frames than to the other.

The sliver after leaving the piecing rolls drops into the trough 831 and passes through the usual trumpet and delivery rolls 112 onto the sliver plate z from which it goes to the usual coiler.

It will be seen that the machine has twin parts operating from the same power shaft, and the construction is such that all the parts are independently adjustable,—a feature which I believe is new with me. The arrangement is such that one side of the machine may be adjusted for short fibered cotton and the other side for long fibered cotton, and as both sides are operated from the same swinging member, one side will be combing while the other is piecing and vice versa. The path of oscillation of the swinging member or the swinging member itself may be adjusted to give it movements according to the character of the cotton to be combed.

It is expected that any lot of cotton will contain about 18% of noils or waste, which should be removed during the combing operation, and, if too much waste is being taken out, it is necessary to adjust the travel of the nipper frames so that they operate more closely to the steel rolls or detaching rolls. If not enough waste is being taken out, the nipper frames should approach not quite so closely to the detaching rolls. By adjusting the position of the crank pin on disk 9 this may be accomplished for both deliveries by the one operation. For this purpose the crank pin 10 running in the slot 11 of the arm 12 is preferably made adjustable toward and from the center or axis of the shaft 8 in any convenient way as by a slot $a^9$ in disk 9, in which its position with relation to the axis of the disk may be changed, thus changing the swing of the arm 12, by which movement is given to the nipper frames. It will be seen that by this one adjustment of the location of this crank pin the movement of all the nipper frames given by the lever or arm 12 may be adjusted by the one operation instead as heretofore by a separate adjustment of each nipper frame. This changes the throw of all the nippers with relation to the detaching rolls so as to make them abstract the necessary amount of noils or waste according to the particular class of cotton being combed.

The inner detaching rolls 84 and 86 are really the effective detaching rolls by which the piecing is done, the rolls 83 and 85 being carrying rolls. The cleaner 110 is simply used to keep the leather top roll clean.

In the above description of the throwing of the nipper frames it must be remembered that in holding the fleece or lap for the combing operation the nippers must be in a substantially vertical plane running through the axis of the comb cylinders, and this point is regulated in the first alinement of the machine by means of the screws 321 and the stop 642, so that whatever the throw of the nipper frames the nippers will always come to this one position. The adjustment of the throw of the nipper frames is an adjustment which allows them to fall back to a point near the central plane of the machine, so that this adjustment of the crank pin 10 by which the movement of the arm 12 is caused and hence a change of the throw of the nipper frames, is an adjustment which affects their rearward movement, that is, their movement when the nippers are open, as the nippers when closed must always come to rest over the axis of the combing cylinder.

In the operation of the machine after the needles have passed through the fleece held by the nipper, the nipper starts to crowd forward toward the detaching rollers. When the nipper has traversed a short distance the top nipper knife begins to open and at the same time the pawl 82, being in a fixed position, engages the ratchet 81 on the feed roll shaft and causes the feed roll to rotate and continue to do so until the nippers have moved to the end of the stroke. At the same time the top comb 48 moves toward the rollers in front of the nippers and is adjusted to traverse as close to the detaching rollers as possible without striking. The top comb's horizontal traverse is constant, that is, it traverses the same distance at all times, while the nipper does not, but it may be given a slight vertical movement by the surface of plate 55 if desired, as below stated.

After the fleece has been combed out by the cylinder needles, its fibers are not of uniform length, and if the nipper was adjusted to swing only to a point a certain distance from the detaching rolls, the rollers would only grip the longest fibers. If the swing of the nipper was lengthened to carry nippers close to detaching rollers, shorter fibers would be carried through the rollers, thus making less waste. By this adjustment the amount of waste may be regulated. The short fibers and all foreign matter are prevented from passing through the front of the machine in the combed product by the top comb, and as the nippers fall back are carried away by the cylinder needles.

The top comb will be operated usually on the horizontal plane only, but in case of the comber working a heavy lap, it is necessary to give the top comb a little more clearance from the cylinder when it falls back from the rollers. The adjustable incline 55 is used for this purpose. This movement when used assists the nippers in striking the lap out of the top comb after the combed fibers have been drawn through, for when the nipper closes, it strikes the lap down, and if the incline 55, lifts the top comb, it is assisting the nipper in separating or striking the lap out of the comb.

Other means of producing the results secured by my machine, which will be within the scope of my invention, will occur to those skilled in the art; the preferred embodiment of my invention only being shown. I have shown only a single unit of twin mechanism operating from a single head, but it will be obvious that a number of units may be arranged end to end all operating from a single head. And one great advantage of my machine in this respect is that its construction shown allows a considerable saving of power and floor space over the single machines now in use. There are also various other advantages in the operation as well as the adjustment of the combing elements which will be seen and understood by those skilled in the art.

A great advantage in such a machine is that all cams and weights are done away with so that the power necessary to operate the machine is reduced materially, as well as the adjustment and repair of the cams themselves. So far as I know there was never a machine of this character built which did not use a large number of revolving cams to actuate the mechanism, and which did not also use weights intermittently applied to the detaching rolls for detaching the sliver. This machine is the only one so far as my knowledge goes which accomplishes the desired end without the use of either revolving cams or any weights. Thus higher production can be had for the same expenditure of power. The deliveries being back to back as shown, a two-delivery machine of this type will require much less floor space than the usual machine. Thus a given area of floor space can deliver more combed sliver when equipped with a comber embodying my invention and with less help than with the combers now in use, for several pairs of deliveries can be readily operated from the same power head.

What I claim as my invention is:—

1. The combing machine above described comprising two nipper mechanisms and means for supporting each whereby it may be oscillated independently of the other, and means for oscillating said nipper mechanisms comprising a rock shaft, arms thereon, and means for rocking said shaft, said arms being located and adapted as said shaft rocks to engage and oscillate each nipper mechanism in turn.

2. The combing machine above described comprising two nipper mechanisms and means for supporting each whereby it may be oscillated independently of the other, yielding means connecting said nipper mechanisms, and means for oscillating said nipper mechanisms comprising a rock shaft, arms thereon, and means for rocking said shaft, said arms being located and adapted as said shaft rocks to engage and oscillate each nipper mechanism in turn.

3. The combing machine above described comprising two nipper mechanisms and means for supporting each whereby it may be oscillated independently of the other, yielding means connecting said nipper mechanisms, and stops adapted to limit the approach of each nipper mechanism toward the other when under the influence of said yielding means, and means for oscillating said nipper mechanisms comprising a rock shaft, arms thereon, and means for rocking said shaft, said arms being located and adapted as said shaft rocks to engage and oscillate each nipper mechanism in turn.

4. The combing machine above described comprising two nipper mechanisms and means for supporting each whereby it may be oscillated independently of the other, yielding means connecting said nipper mechanisms, and stops adapted to limit the approach of each nipper mechanism toward the other when under the influence of said yielding means, and means for oscillating said nipper mechanisms comprising a rock shaft, arms thereon, and means for rocking said shaft, said arms being located and adapted as said shaft rocks to engage and oscillate each nipper mechanism in turn, said means for rocking said shaft being adjustably attached thereto whereby the paths of oscillation of said nipper mechanism may be varied to enable them to comb fiber of different lengths.

5. The combing machine above described comprising two nipper mechanisms, each having an upper and a lower nipper, and means for supporting each whereby it may be oscillated independently of the other, and means for oscillating said nipper mechanisms comprising a rock shaft, arms thereon, and means for rocking said shaft, said arms being located and adapted as said shaft rocks to engage and oscillate each nipper mechanism in turn, said nipper mechanisms each comprising rocker arms and means for mounting them, an upper nipper mounted on said rocker arms, and means adapted to engage said rocker arms when said nipper mechanism is oscillated and cause the operation of said upper nipper.

6. The combing machine above described comprising two nipper mechanisms and means for supporting each whereby it may be oscillated independently of the other, and means for oscillating said nipper mechanisms comprising a rock shaft, arms thereon, and means for rocking said shaft, said arms being located and adapted as said shaft rocks to engage and oscillate each nipper mechanism in turn, said nipper mechanisms each comprising rocker arms and means for mounting them, an upper nipper mounted on said rocker arms, and yielding means adapted to engage said rocker arms when said nipper mechanism is oscillated and cause the descent of said upper nipper.

7. The combing machine above described comprising two nipper mechanisms and means for supporting each whereby it may be oscillated independently of the other, and means for oscillating said nipper mechanisms comprising a rock shaft, arms thereon, and means for rocking said shaft, said means comprising a crank disk and a crank arm operated thereby, one end of said crank arm being mounted on said shaft, said arms being located and adapted as said shaft rocks to engage and oscillate each nipper mechanism in turn.

8. The combing machine above described comprising two nipper mechanisms and means for supporting each whereby it may be oscillated independently of the other, and means for oscillating said nipper mechanisms comprising a rock shaft, arms thereon, and means for rocking said shaft, said means comprising a crank disk and a crank arm operated thereby, one end of said crank arm being mounted on said shaft, and means connecting said crank arm and said shaft whereby the position of said crank arm about said shaft may be adjusted to adjust the movement of said shaft, said arms being located and adapted as said shaft rocks to engage and oscillate each nipper mechanism in turn.

9. The combing machine above described comprising two nipper mechanisms and means for supporting each whereby it may be oscillated independently of the other, and means for oscillating said nipper mechanisms comprising a rock shaft, arms thereon, and means for rocking said shaft, said means comprising a crank disk and a crank arm operated thereby, one end of said crank arm being mounted on said shaft, the connection of the other end of said crank arm with said crank disk being adjustable longitudinally of the crank arm, said arms being located and adapted as the shaft rocks to engage and oscillate each nipper mechanism in turn.

10. The combing machine above described comprising two nipper mechanisms and means for supporting each whereby it may be oscillated independently of the other, and means for oscillating said nipper mechanisms comprising a rock shaft, arms thereon, and means for rocking said shaft, said means comprising a crank disk and a crank arm operated thereby, one end of said crank arm being mounted on said shaft, the connection of the other end of said crank arm with said crank disk being adjustable radially of the crank disk, said arms being located and adapted as said shaft rocks to engage and oscillate each nipper mechanism in turn.

11. The machine above described comprising two pairs of lap-combing mechanisms and two pairs of nipper mechanisms, each located in operative relation to one of said combing mechanisms, means for mounting said nipper mechanisms whereby they may be oscillated independently, a main shaft, and means operated by said main shaft to cause each nipper mechanism in turn to present its lap to the combing mechanism.

12. The machine above described comprising two pairs of lap-combing mechanisms and two pairs of nipper mechanisms, each located in operative relation to one of said combing mechanisms, means for mounting said nipper mechanisms whereby they may be oscillated independently, a main shaft, and a single means operated by said main shaft to cause each nipper mechanism in turn to present its lap to the combing mechanism.

13. The machine above described comprising two pairs of lap-combing mechanisms, each comprising a rotary member and a horizontally-reciprocating member, and two pairs of nipper mechanisms, each located in operative relation to one of said combing mechanisms, means for mounting said nipper mechanisms whereby they may be oscillated independently, a main shaft, and means operated by said main shaft to cause each nipper mechanism in turn to present its lap to the combing mechanism.

14. In a combing machine, two nipping mechanisms and two combing mechanisms, each combing mechanism being associated with one of said nipping mechanisms, and a single freely-swinging member adapted to engage alternately first one nipping mechanism and then the other to cause them to oscillate, and means for operating said swinging member.

15. In a combing machine, two nipper frames, a nipper blade fixedly mounted on both nipper frames, means for oscillating said frames, a rock shaft mounted in said frames, and an upper nipper mounted on said shaft, and means for rocking said shaft.

16. In a combing machine, a combing cylinder, detaching rolls, nipper frames, a lower nipper blade fixedly mounted on said frames, and means for oscillating said frames and said blade from a point near the detaching rolls to a point above the top of the combing cylinder, means for feeding the sliver on said nipper blade, and an upper nipper carried by said nipper frames to be oscillated therewith and independently thereof.

17. In a combing machine, a combing cylinder, detaching rolls, nipper frames, a nipper blade fixedly mounted on said nipper frames, and means for supporting said frames and blade whereby they may be oscillated, means for oscillating them, whereby the nipper blade will be oscillated from a point near the detaching rolls to a point adjacent the highest point on the combing cylinder, an upper nipper carried by said frames to be oscillated therewith and also to have an oscillatory movement independently of said nipper blade, and positive means for operating said upper nipper.

18. In a combing machine, two pairs of nipper frames, two nipper plates, one joining each pair of frames, two rock shafts, each pair of nipper plates depending from one of said rock shafts, a rock shaft located in a vertical plane between said nipper frames and having arms depending therefrom and adapted to engage each pair of nipper frames in turn to rock them, a shaft located in each pair of nipper frames, rocker arms on each of said last-named shafts and means for operating the last-named rocker arms to rock said last-named shafts, and upper nippers mounted on said last-named shafts to be operated thereby.

19. In a combing machine, two shafts, a pair of nipper frames depending from each shaft and adapted to be oscillated thereon, means located between each pair of nipper frames adapted to engage and oscillate each pair of nipper frames independently.

20. In a combing machine, two shafts, a pair of nipper frames depending from each shaft and adapted to be oscillated thereon, means located between said pair of nipper frames adapted to engage and oscillate said nipper frames independently, and means whereby the radius of oscillation of said nipper frames may be adjusted.

21. In a combing machine, two shafts, a pair of nipper frames depending from each shaft and carrying nippers, a lap plate also depending from each shaft and connected at its lower end to said nipper frames, and a single means for oscillating both pair of nipper frames and said lap plates.

22. In a combing machine, two shafts, a pair of nipper frames depending from each shaft and carrying upper and lower nippers, a lap plate also depending from each shaft and connected at its lower end to said nipper frames, and a single means for oscillating both pairs of nipper frames and said lap plates, and means located on said lower nipper and operated by the oscillation of its nipper frame whereby the lap will be fed along said lap plate to said lower nipper.

23. In a combing machine, two pairs of nipper frames, means for supporting them whereby each pair may be oscillated, a nipper mechanism located on each pair of frames, means for adjusting each nipper frame vertically, and means for adjusting the oscillations of said frames whereby said nipper mechanisms may present fleeces having fibers of different lengths to be combed.

24. In a combing machine, two shafts, two pairs of nipper frames, each depending from one of said shafts, a nipper mechanism located on each pair of said frames, a single means for oscillating both pairs of frames, and means for adjusting the radial distance of each nipper mechanism from its axis of oscillation independently of the other nipper mechanism, whereby said nipper mechanisms may have oscillating paths of different lengths and be capable of acting upon different classes of fibers.

25. In a combing machine, two shafts, two pairs of nipper frames, each depending from one of said shafts, a nipper mechanism located on each pair of nipper frames, a single means for oscillating both pairs of frames, each nipper mechanism comprising a shaft, arms mounted thereon, an upper nipper mounted on said arms, and means adapted to operate said shafts whereby said nippers will be raised and lowered and means for adjusting the radial length of said frames whereby operations of raising and lowering said upper nippers may be varied.

26. In a combing machine, a shaft, a pair of nipper frames, a nipper blade mounted on said frames, and a lap plate, said nipper frames being mounted to swing from said shaft and having a radial adjustment with relation thereto whereby the path of swing of said nipper blade may be adjusted, said lap plate being also mounted on said shaft to swing with said nipper frames, its lower edge being adjustably attached to said nipper blade whereby it will conform to the adjustment of said nipper frames.

27. In a combing machine, two pairs of oscillatory nipper frames located back to back, each carrying nipper mechanism, a yielding connection between said pairs of frames adapted to pull them toward each other, stops located to limit the approach of one pair toward the other, and means for alternately moving each pair in a direction away from the other.

28. In a combing machine, two pairs of oscillatory nipper frames located back to back, each carrying nipper mechanism, a yielding connection between said pairs adapted to pull them toward each other, stops located to limit the approach of one pair toward the other, and means for alternately moving each pair in a direction away from the other, said means comprising a rock shaft and an arm mounted thereon.

29. In a combing machine, two pairs of oscillatory nipper frames located back to back, each carrying nipper mechanism, a yielding connection between said pairs adapted to pull them toward each other, adjustable stops located to limit the approach of each pair toward the other, and means for alternately moving one pair from its stop, said means comprising a rock shaft and means mounted thereon adapted to engage said pairs of nipper frames alternately.

30. In a combing machine, two pairs of oscillatory nipper frames located back to back, each carrying nipper mechanism, a yielding connection between said pairs adapted to pull them toward each other, adjustable stops located to limit the approach of each pair toward the other, and means for alternately moving one pair from its stop, said means comprising a rock shaft and means mounted thereon adapted to engage said pairs of nipper frames alternately, said means being adjustable with relation to the axis of said shaft whereby the oscillatory movements of each pair of nipper frames may be adjusted with relation to the other, to comb fibers of different lengths.

31. In a combing machine, a shaft, a pair of nipper frames mounted thereon to be oscillated, a nipper blade joining said nipper frames to be oscillated therewith, a rotatable shaft mounted in said nipper frames, arms mounted on said last-named shaft, an upper nipper carried by said arms and means for rocking said last-named shaft whereby said upper nipper will be reciprocated, comprising a rocker arm mounted on said last-named shaft and a lug suitably mounted and adapted to be engaged by said rocker arm as said nipper frames are oscillated in one direction whereby said upper nipper will be lifted from said nipper blade, and means for causing said upper nipper to engage the sliver on said nipper blade when the nipper frames oscillate in the opposite direction.

32. In a combing machine, a pair of nipper frames mounted to be oscillated, a nipper plate jointing said nipper frames, a rotatable shaft mounted in said nipper frames, arms mounted on said shaft, an upper nipper carried by said arms, and means for rocking said shaft whereby said upper nipper will be reciprocated, said means comprising a rocker arm mounted on said shaft and a lug having an inclined surface adapted to be engaged by said arms as said nipper frames move in one direction whereby said upper nipper will be lifted from said nipper plate, and means for causing said upper nipper to engage the sliver on the nipper plate when the nipper frames move in the other direction, said means comprising yielding members adapted to be engaged by said upper nipper-carrying arms when said nipper frames move in the opposite direction.

33. In a combing machine, two pairs of oscillatory nipper frames located back to back, each pair carrying a nipper plate and each pair carrying a shaft, oscillatory upper nippers one located on each shaft and adapted to be reciprocated, and means for rocking said shafts in opposite directions comprising stationarily-mounted lugs, an arm on each shaft adapted to engage one of said lugs to rotate its shaft in one direction, and spring-controlled levers located to be engaged by said upper nipper-carrying arms to rotate its shaft in the opposite direction whereby as said nipper frames oscillate one of said upper nippers will be moved in one direction while the other upper nipper will be moved in the other direction.

34. In a combing machine, two oppositely-disposed oscillatory pairs of nipper frames, each pair carrying a nipper mechanism, and means for oscillating said frames comprising a rock shaft, connections between said rock shaft and said frames whereby said frames will be oscillated, and means whereby said rock shaft will be rocked, comprising an arm mounted thereon and a crank disk having a crank pin connected to said arm.

35. In a combing machine, two oppositely-disposed oscillatory pairs of nipper frames, each pair carrying a nipper mechanism, and means for oscillating said frames comprising a rock shaft, connections between said rock shaft and said frames whereby said rock shaft will be oscillated, and means whereby frames will be rocked, comprising an arm mounted thereon and a crank disk having a crank pin connected to said arm, the position of said crank pin being adjustable toward and from the axis of said disk whereby the length of swing of said arm may be adjusted.

36. In a combing machine, two oppositely-disposed pairs of oscillatory nipper frames, each pair carrying a nipper mechanism, two pairs of detaching rolls, each pair located in operative relation to one of said nipper mechanisms, and a single means adapted to oscillate and cause the oscillation of each pair of said nipper frames to carry a nipper mechanism toward its pair of detaching rolls while the opposite nipper mechanism is receding from its detaching rolls.

37. In a combing machine, two oppositely-disposed pairs of oscillatory nipper frames, each pair carrying a nipper mechanism, two pairs of detaching rolls, each pair located in operative relation to one of said nipper mechanisms, and means for oscillating each pair of said nipper frames to carry a nipper mechanism toward its pair of detaching rolls while the opposite nipper mechanism is receding from its detaching rolls, and means comprising stops and adjusting screws located on each nipper frame, said screws being adapted to engage said stops and limit the oscillations of said nipper frames in one direction.

38. In a combing machine, two oppositely-disposed pairs of oscillatory nipper frames, each pair carrying a nipper mechanism, two pairs of detaching rolls, each pair located in operative relation to one of said nipper mechanisms, and means for oscillating each pair of said nipper frames to carry a nipper mechanism toward its pair of detaching rolls while the opposite nipper mechanism is receding from its detaching rolls, and a yielding spring connecting said nipper frames.

39. A combing machine comprising a rock shaft and means for rocking it, a rocker arm depending therefrom, two nipping and combing mechanisms located back to back, each delivering a separate sliver, said nipping mechanisms located to be engaged in turn and rocked by said rocker arm and said combing mechanisms being connected with said rock shaft rocking means whereby it will be operatively connected to and operate with said nipping mechanisms.

40. A combing machine comprising a frame, two pairs of nipper frames mounted to oscillate thereon, a nipper blade connecting each pair of nipper frames, means for oscillating said nipper frames, a shaft mounted in each pair of nipper frames, feed rolls mounted on shafts to press and feed the sliver, and means for rotating said feed rolls intermittently and alternately comprising a ratchet mounted on said shaft and a pawl mounted on said first-named frame, whereby the oscillations of each frame will cause each ratchet in turn to engage its pawl and partially rotate its roll and laps will be fed alternately to the two nipper mechanisms.

41. In a machine of the kind described comprising a plurality of oscillatory nipping and combing mechanisms located back to back, a swinging member located to engage said nippers and combing mechanisms alternately and oscillate them, a main shaft, and connections comprising gears whereby said swinging member will be swung.

42. A combing machine comprising a centrally-disposed oscillatory shaft and means to oscillate it, oscillatory heads mounted independently of each other on each side of said shaft and comprising nipper mechanisms and lap feed mechanisms, and means operable by the oscillation of said heads whereby the nippers in the nipper mechanism of one head will be operated to grasp its tuft while the nippers in the nipper mechanism of the other head will be opened and its lap will be fed between its opened nippers.

43. In a combing mechanism, two oscillatory heads mounted independently of each other and located back to back, each comprising a nipper mechanism, means for feeding its lap to each nipper mechanism in turn, a single means for oscillating said heads adapted to cause the feeding of its lap to one nipper mechanism while the other nipper mechanism is presenting its lap to the combing mechanism.

44. A combing mechanism having oscillatory heads, a separate means for mounting each head, said heads being located back to back, means for feeding a lap to each head, and a single means adapted to engage each head in turn and cause it to comb its lap while the feeding mechanism of the other head is operating to feed its lap to its combing mechanism.

HARRY TUNSTALL.